(12) United States Patent
Kodimer et al.

(10) Patent No.: US 7,779,364 B2
(45) Date of Patent: Aug. 17, 2010

(54) SYSTEM AND METHOD FOR GENERATING A GRAPHICAL USER INPUT INTERFACE VIA AN ASSOCIATED DISPLAY

(75) Inventors: Marianne Kodimer, Huntington Beach, CA (US); William Su, Riverside, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 415 days.

(21) Appl. No.: 11/684,403

(22) Filed: Mar. 9, 2007

(65) Prior Publication Data

US 2008/0184155 A1 Jul. 31, 2008

Related U.S. Application Data

(60) Provisional application No. 60/886,739, filed on Jan. 26, 2007.

(51) Int. Cl.
*G06F 3/00* (2006.01)
(52) U.S. Cl. .............................. 715/773; 341/20; 341/22; 345/168; 345/156
(58) Field of Classification Search ................ 715/773; 345/173, 168, 22
See application file for complete search history.

(56) References Cited

U.S. PATENT DOCUMENTS

| | | | | |
|---|---|---|---|---|
| 5,486,058 A | * | 1/1996 | Allen | 400/485 |
| 6,501,464 B1 | * | 12/2002 | Cobbley et al. | 345/173 |
| 6,597,345 B2 | * | 7/2003 | Hirshberg | 345/168 |
| 7,184,028 B2 | * | 2/2007 | Wu et al. | 345/173 |
| 7,216,588 B2 | * | 5/2007 | Suess | 101/486 |
| 2002/0085038 A1 | * | 7/2002 | Cobbley et al. | 345/773 |
| 2003/0141992 A1 | * | 7/2003 | Page | 341/22 |
| 2004/0169641 A1 | * | 9/2004 | Bean et al. | 345/168 |
| 2006/0053387 A1 | * | 3/2006 | Ording | 715/773 |
| 2006/0190836 A1 | * | 8/2006 | Ling Su et al. | 715/773 |
| 2008/0138135 A1 | * | 6/2008 | Gutowitz | 400/486 |
| 2008/0184155 A1 | * | 7/2008 | Kodimer et al. | 715/773 |
| 2008/0242353 A1 | * | 10/2008 | Willey | 455/556.2 |
| 2009/0007001 A1 | * | 1/2009 | Morin et al. | 715/773 |

* cited by examiner

*Primary Examiner*—William L Bashore
*Assistant Examiner*—Meseker Takele
(74) *Attorney, Agent, or Firm*—Tucker Ellis & West LLP

(57) ABSTRACT

The subject application is directed to a system and method for generating a graphical user input interface via an associated graphical user interface. Data representative of a user input interface from storage. Preferably, this data includes graphical representations of each character associated with a standard QWERTY keyboard, inclusive of modified characters. The retrieved graphical data is then used to generate a user input interface on an associated touch screen. The user then selects a character from those characters displayed via the touch screen. The selected character is then displayed to the user in an associated data field.

12 Claims, 8 Drawing Sheets

SYSTEM AND METHOD FOR GENERATING A GRAPHICAL USER INPUT INTERFACE VIA AN ASSOCIATED DISPLAY

CROSS-REFERENCE TO RELATED APPLICATIONS

This applications claims priority to U.S. Provisional Patent Application Ser. No. 60/886,739, filed Jan. 26, 2007, titled "A SYSTEM AND METHOD FOR GENERATING A GRAPHICAL USER INPUT INTERFACE VIA AN ASSOCIATED DISPLAY".

BACKGROUND OF THE INVENTION

The subject application is directed to a system and method for generating a graphical user input interface via an associated graphical user interface. More particularly, the subject application is directed to a system and method for generating a QWERTY keyboard inclusive of modified characters proximally located with corresponding base characters on a touch screen user interface.

In general, various devices, such as document processing devices, tablet personal computers, personal data assistants, cash registers, and the like, incorporate a user input interface, such as a touch screen interface. The touch screen interface, typically implemented as a liquid crystal display, receives user input directly from the screen via a user's finger, stylus, or a combination thereof. When using a touch screen interface to simulate other common user input interfaces, e.g., mouse, keyboard, etc., a user is limited to one touch equating to one action. That is, the touch screen cannot accept multiple simultaneous inputs. For example, when using a touch screen to simulate a QWERTY keyboard, the user is not able to select the SHIFT key and a corresponding letter key simultaneously to simulate a capital letter. Thus, when a user selects the SHIFT key and the letter key simultaneously, the desired input is not received. Table Personal Computers, or other stylus-based touch screen devices typically implement the SHIFT key as a toggle-key, switching the display of the QWERTY keyboard from a normal keyboard to a keyboard displaying the alternate characters, e.g., displaying the symbols !, @, #, $, %, ^, &, *, (, ), instead of the non-shift symbols 1, 2, 3, 4, 5, 6, 7, 8, 9, 0, respectively. This form of functionality is often confusing, as few users expect the SHIFT key to act as a toggle key.

SUMMARY OF THE INVENTION

In accordance with one embodiment of the subject application, there is provided a shift free keyboard input system.

Further, in accordance with one embodiment of the subject application, there is provided a system and method for generating a graphical user input interface via a graphical user interface.

Still further, in accordance with one embodiment of the subject application, there is provided a system for generating a QWERTY keyboard inclusive of shift characters proximally located with corresponding non-shift characters on a touch screen user interface.

Further, in accordance with one embodiment of the subject application, there is provided a shift free keyboard input system. The system includes a user input area including a plurality of letter entry keys and a plurality of non-letter character keys arranged in a standardized keyboard layout. In such a system, each of the plurality of non-letter character keys include an adjacent, concurrently viewable non-letter character key corresponding to a function associated with a shift thereof, on the standardized keyboard layout such that each function is available concurrently via a separate input.

In one embodiment of the subject application, the input area is comprised of a touch screen and each of the keys are formed on a sub-area of the input area, having an associated visual indicator corresponding to the standardized keyboard layout.

In another embodiment of the subject application, the standardized keyboard layout includes a QWERTY layout or a Dvorak layout.

In a further embodiment of the subject application, each of the plurality of non-letter character keys is disposed along a row above the letter entry keys, with each adjacent, concurrently viewable non-letter character key being disposed along a row above the row of non-letter character keys.

Still further, in accordance with one embodiment of the subject application, the plurality of non-letter character keys include numeric input keys.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for generating a graphical user input interface via an associated graphical user interface. In particular, the subject application is directed to a system and method for generating a QWERTY keyboard inclusive of modified characters proximally located with corresponding base characters on a touch screen user interface. It will be understood by those skilled in the art that the term "base character" refers to those characters selectable via a QWERTY keyboard that do not require the simultaneous selection of a modifier key (SHIFT, ALT, CTRL, etc.). Similarly, the term "modified character" as used herein references those characters accessible via a QWERTY keyboard that require the simultaneous selection of both a modifier key (SHIFT, ALT, CTRL) and a base key (1, 2, 3, A, B, C, etc). It will become apparent to those skilled in the art that the system and method described herein are suitably adapted to a plurality of varying electronic fields employing graphical user interfaces, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
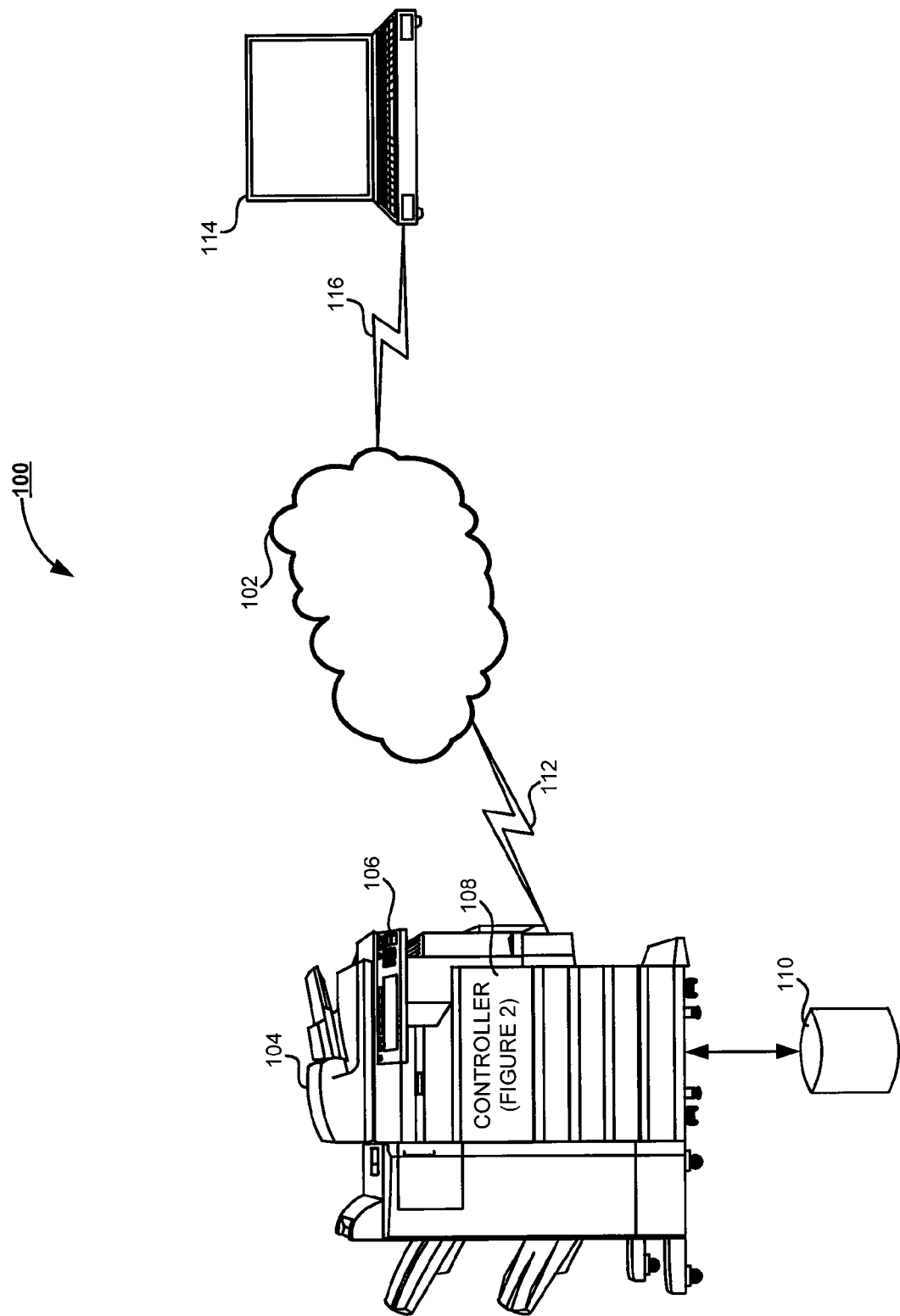
FIG. 1 is an overall diagram of the system for generating a graphical user input interface via an associated graphical user interface according to one embodiment of the subject application.

Referring now to FIG. 1, there is shown an overall diagram of the system 100 for generating a graphical user input interface via an associated graphical user interface in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like. The functioning of the document processing device 104 will better be understood in conjunction with the block diagrams illustrated in FIGS. 4 and 5, explained in greater detail below.

According to one embodiment of the subject application, the document processing device 104 is suitably equipped to receive a plurality of portable storage media, including, without limitation, Firewire drive, USB drive, SD, MMC, XD, Compact Flash, Memory Stick, and the like. In the preferred embodiment of the subject application, the document processing device 104 further includes an associated user interface 106, such as a touch-screen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a touch screen display, suitably adapted to display one or more graphical elements, text data, images, or the like, to an associated user, receive input from the associated user, and communicate the same to a backend component, such as a controller 108, as explained in greater detail below. According to the preferred embodiment of the subject application, the user interface 106 is capable of displaying a user input interface, such as a graphical representation of a standard user input device, e.g., a QWERTY keyboard. Preferably, the document processing device 104 is communicatively coupled to the computer network 102 via a suitable communications link 112. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for generating a graphical user input interface of the subject application. The functioning of the controller 108 will better be understood in conjunction with the block diagrams illustrated in FIGS. 4 and 5, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store a document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a user device 114, in data communication with the computer network 102 via a communications link 116. It will be appreciated by those skilled in the art that the user device 114 is shown in FIG. 1 as a laptop computer for illustration purposes only. As will be understood by those skilled in the art, the user device 114 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 116 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 114 is suitably adapted to generate and transmit electronic documents, document processing instructions, user interface modifications, upgrades, updates, personalization data, or the like, to the document processing device 104, or any other similar device coupled to the computer network 102.

Figure 2:
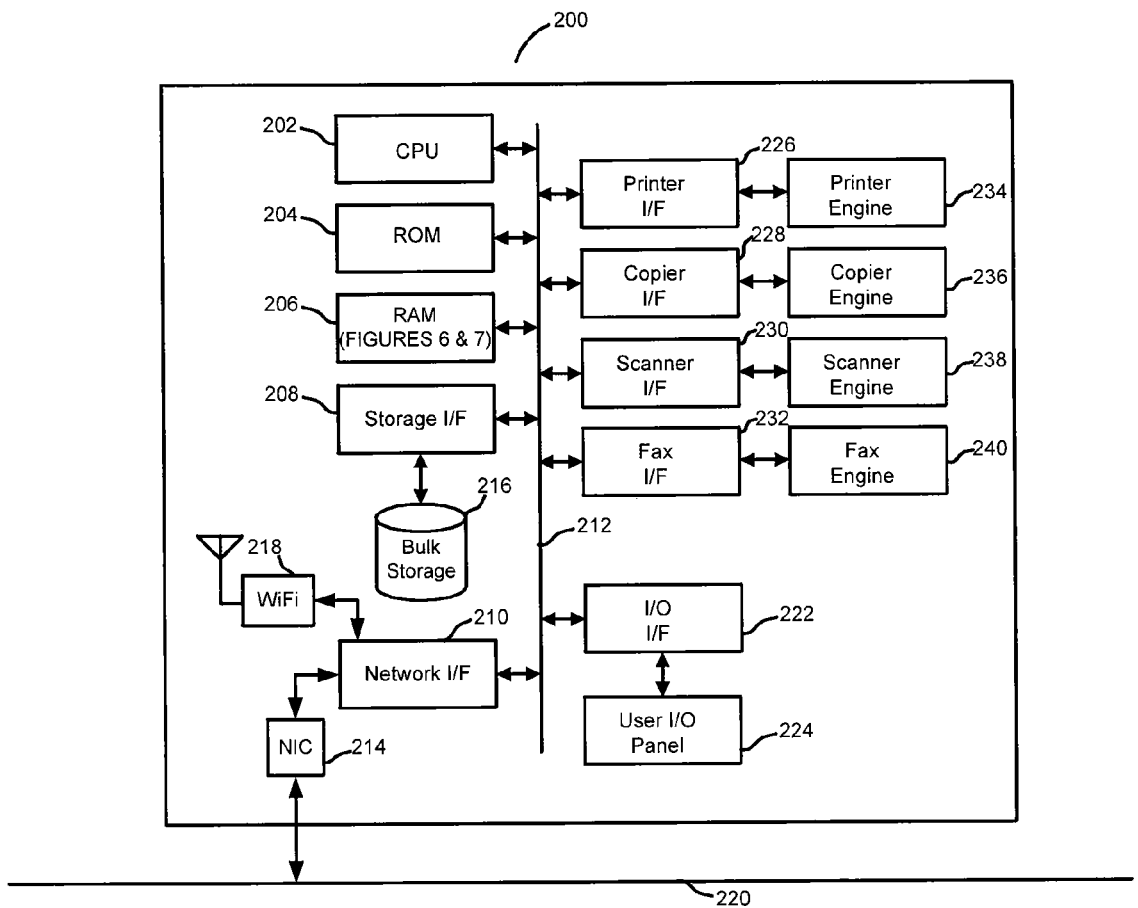
FIG. 2 is a block diagram illustrating device hardware for use in the system for generating a graphical user input interface via an associated graphical user interface according to one embodiment of the subject application.

Turning now to FIG. 2, illustrated is a representative architecture of a suitable device 200 on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the server 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
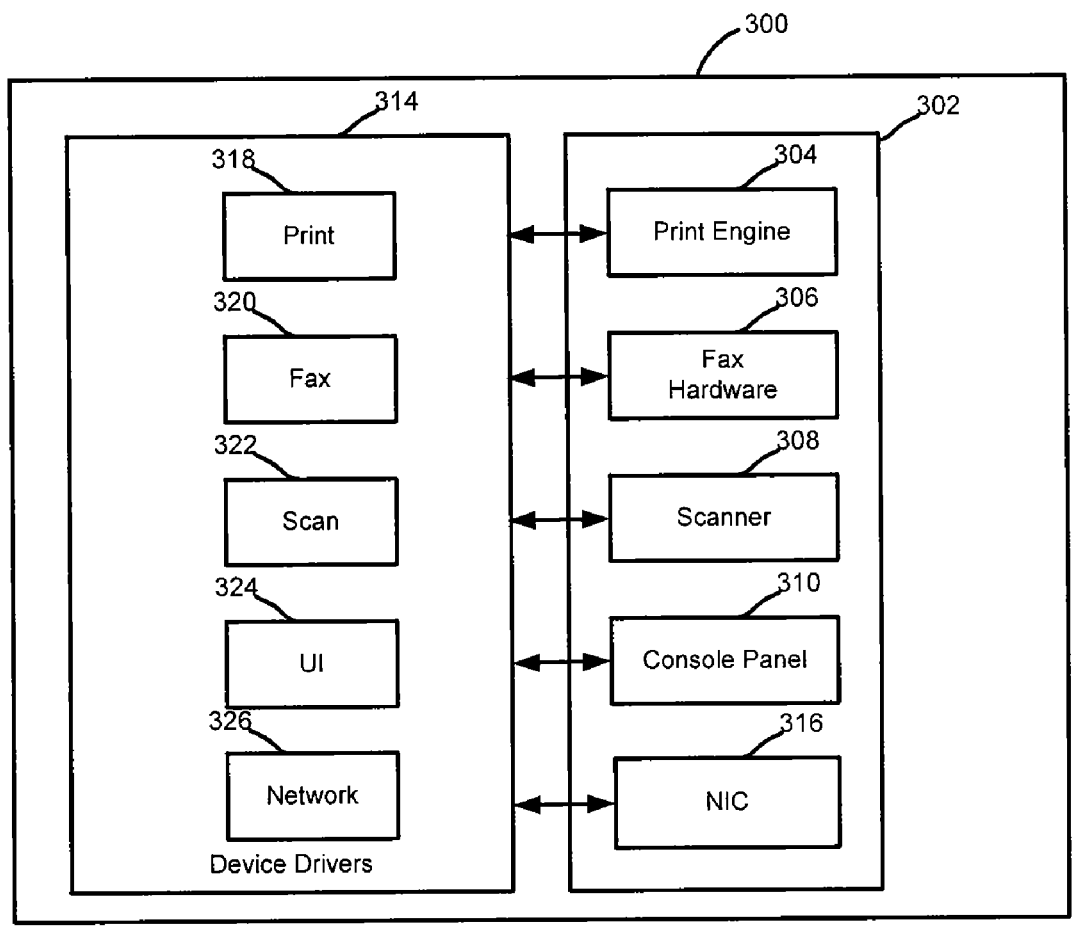
FIG. 3 is a functional diagram illustrating the device for use in the system for generating a graphical user input interface via an associated graphical user interface according to one embodiment of the subject application.

Turning now to FIG. 3, illustrated is a suitable document processing device for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
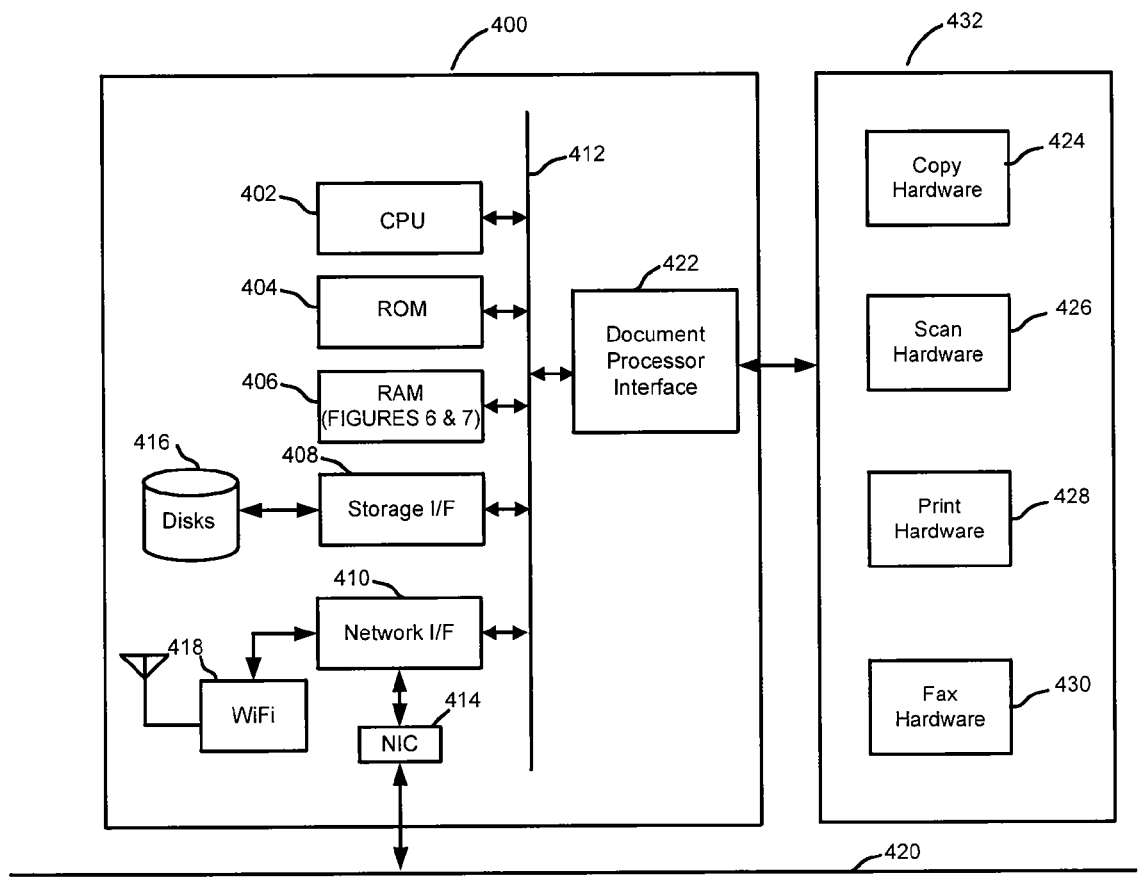
FIG. 4 is a functional diagram illustrating the controller for use in the system for generating a graphical user input interface via an associated graphical user interface according to one embodiment of the subject application.

Turning now to FIG. 4, illustrated is a representative architecture of a suitable backend component, i.e., the controller 400, shown in FIG. 1 as the controller 108, on which operations of the subject system 100 are completed. The skilled artisan will understand that the controller 108 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with bus the 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
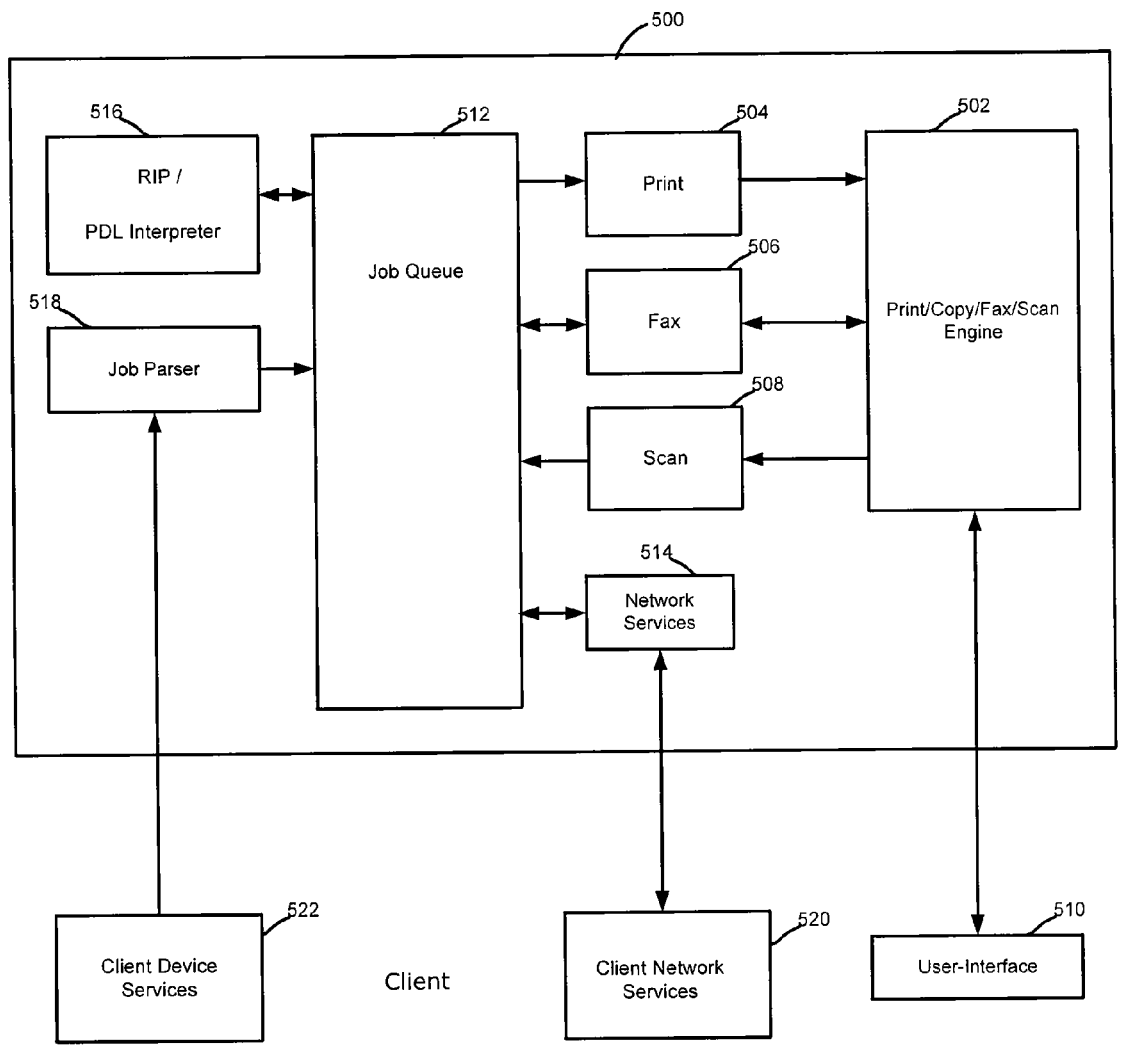
FIG. 5 is a flowchart illustrating a method for generating a graphical user input interface via an associated graphical user interface according to one embodiment of the subject application.

Functionality of the subject system 100 is accomplished on a suitable document processing device, such as the document processing device 104, which includes the controller 400 of FIG. 4, (shown in FIG. 1 as the controller 108) as an intelligent subsystem associated with a document processing device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 508 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FYP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

In operation, when user input of an alphanumeric sequence of characters is required, a touch screen component retrieves data representative of a user input interface from storage, such as, for example and without limitation, a graphical representation of a user input device, e.g., a QWERTY keyboard. Preferably, this data includes graphical representations of each character associated with a standard QWERTY keyboard, inclusive of modified characters. As will be appreciated by those skilled in the art, modified characters, as used herein, correspond to those characters of a standard QWERTY keyboard that are accessible only through the selection of a modifier key, such as, for example and without limitation, the SHIFT key, the ALT key, the CTRL key, or the like, and a respective base key. Suitable examples of modified characters include, for example and without limitation, the "!" corresponding to a modifier key "SHIFT" simultaneously selected with the "1" base key, the "@" corresponding to a modifier key "SHIFT" simultaneously selected with the "2" base key, the "#" corresponding to a modifier key "SHIFT" simultaneously selected with the "3" base key, the "$" corresponding to a modifier key "SHIFT" simultaneously selected with the "4" base key, the "?" corresponding to a modifier key "SHIFT" simultaneously selected with the "/" base key, the ">" corresponding to a modifier key "SHIFT" simultaneously selected with the "." base key, and the like. The skilled artisan will appreciate that other examples of modifier key combinations are readily adaptable to implementation in accordance with the subject application.

The retrieved graphical data is then used to generate a user input interface on the associated touch screen. In accordance with one embodiment of the subject application, the user input interface is an alphanumeric keyboard, wherein each modified character is displayed in close proximity to its associated base key. For example, a "!" modified character key is displayed above the "1" base character key. Additional examples include a "?" modified character key located in close proximity to its base "/" character key, e.g., to the immediate right of the "/" key.

Thus, as will be appreciated by those skilled in the art, the user is presented, via the associated touch screen display, with a QWERTY keyboard input interface which displays all standard character keys, as well as those selected modified character keys, without requiring the user to toggle a separate display, or first select a modifier key. The user then selects a character from those characters displayed via the touch screen, which is received by the controller 108 or other suitable component associated with the document processing device 104. The selected character is then displayed to the user in an associated data field. The controller 108 or other suitable component of the document processing device 104 then determines whether an enter command has been received from the associated user. When no command has been received, additional characters are then selected by the associated user. When the enter command has been received, e.g., to continue with the user input of instructions to the associated document processing device 104, the operation displaying the graphical user input interface terminates.

In accordance with one example embodiment of the subject application, the document processing device 104 is suitably adapted to provide a plurality of document processing services. Preferably, the services include, for example and without limitation, an electronic mail service, a printing service, a copying service, a scan-to-storage service, a facsimile service, or the like. The skilled artisan will appreciate that the a user is capable of requesting such a service via the user interface 106 associated with the document processing device 104, remotely via the user device 114, or the like. The user first selects a desired document processing operation, e.g., service, via the user interface 106. A determination is then made by the controller 108, or other suitable component associated with the document processing device 104, whether the selected document processing operation requires an alphanumeric input from the associated user.

When no alphanumeric input is required from the user, the user is prompted, via the user interface 106, to select additional options associated with the requested document processing operation. When an alphanumeric input is required to facilitate the requested document processing operation, e.g., an electronic mail address, a facsimile recipient, a file name, or the like, the controller 108 or other suitable component associated with the document processing device 104 retrieves data from storage 110 representing a user input interface, e.g., an alphanumeric keyboard. The skilled artisan will appreciate that a suitable keyboard is capable of including, for example and without limitation, a QWERTY keyboard. In accordance with the preferred embodiment of the subject application, the keyboard data retrieved from storage 110 includes data representing modified key characters, such as, for example and without limitation, "!", "@", "#", "$", "%", etc. Preferably, these modified characters are located in close proximity to the base key from which they would depend on a standard QWERTY keyboard. Thus, as will be understood by those skilled in the art, the "!" character key is located in close proximity, e.g., above, the "1" character key, the "@" character key is located in close proximity, e.g., above, the "2" character key, the "#" character key is located in close proximity, e.g., above, the "3" character key, the "$" character key is located in close proximity, e.g., above, the "4" character key, the "%" character key is located in close proximity, e.g., above, the "5" character key, etc.

The controller 108 or other suitable component associated with the document processing device 104 then generates, in accordance with the retrieved user input interface data, a keyboard on the display associated with the user interface 106. In accordance with the preferred embodiment of the subject application, the display associated with the user interface 106 is a touch screen interface, whereupon user contact with an icon displayed on the touch screen is interpreted as a selected character. Thus, as the user selects a character icon from the keyboard displayed on the associated display, the selected character is generated in a suitable display field on the user interface 106. It will be appreciated by those skilled in the art that such operations continue until the user is satisfied with the character string selected.

For example, when the user has selected an electronic mail operation, the keyboard is displayed to the user to facilitate the input of the recipient's electronic mail address. The user then selects the characters from the keyboard denoting the recipient address. As the skilled artisan will appreciate, the user is not required to first select a modifier key to select the "@" character, as the subject application advantageously displays the same to the user on the user input interface displayed on the associated user interface 106. It will be understood by those skilled in the art that while reference was made above to the subject application in the document processing field, the system and method described therein is capable of application to any field requiring alphanumeric input via a touch screen interface.

Figure 6:
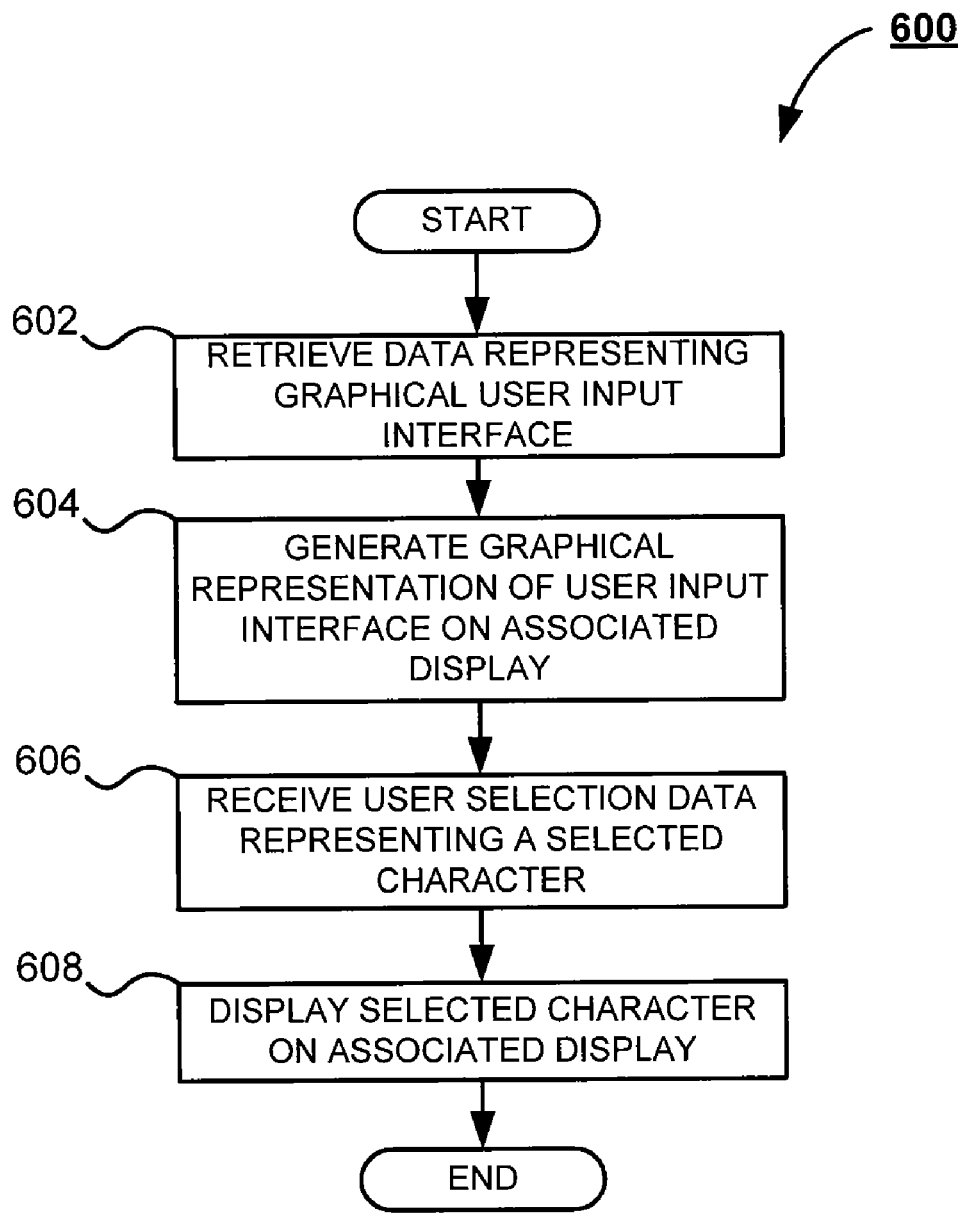
FIG. 6 is a flowchart illustrating a method for generating a graphical user input interface via an associated graphical user interface according to one embodiment of the subject application.

The skilled artisan will appreciate that the subject system 100 and components described above with respect to FIG. 1, FIG. 2, FIG. 3, FIG. 4, and FIG. 5 will be better understood in conjunction with the methodologies described hereinafter with respect to FIG. 6 and FIG. 7. Turning now to FIG. 6, there is shown a flowchart 600 illustrating a method for generating a graphical user input interface via an associated graphical user interface in accordance with one embodiment of the subject application. Beginning at step 602, data representing a graphical user input interface is retrieved from an associated storage. At step 604, a graphical representation of the user input device is generated on an associated display. Preferably, the graphical representation of the user input device is a graphical representation of a QWERTY keyboard, wherein modified character keys are displayed in close proximity to their respective base character keys. For example, the "%" modified character is displayed to an associated user above the "5" base character key. User selection data is received at step 606 corresponding to a character selected by the associated user. The selected character, corresponding to the received user selection data, is then displayed to the user via the associated display at step 608.

Figure 7:
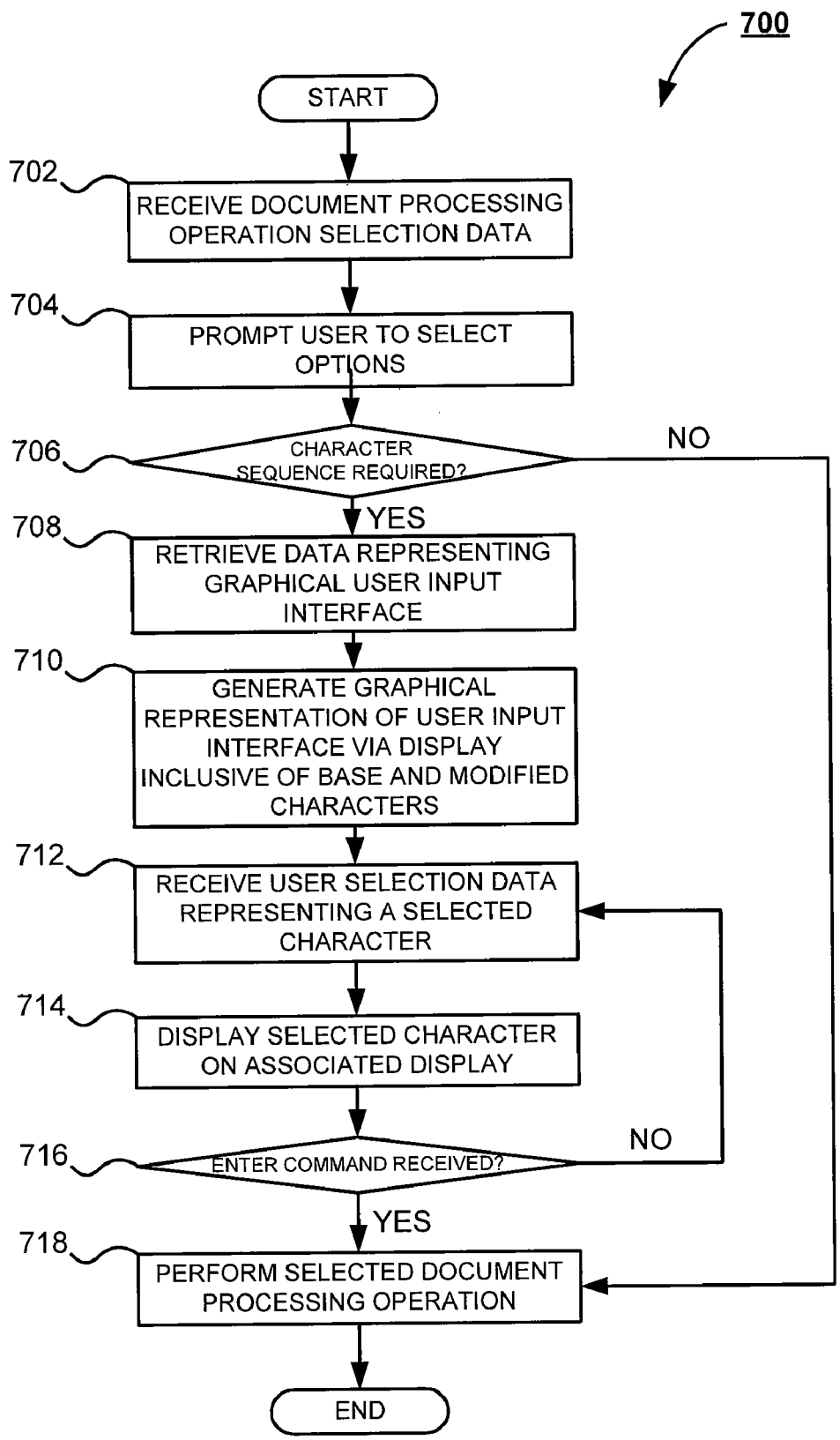
FIG. 7 is a flowchart illustrating a method for generating a graphical user input interface via an associated graphical user interface according to one embodiment of the subject application.

Referring now to FIG. 7, there is shown a flowchart 700 illustrating a method for generating a graphical user input interface via an associated graphical user interface in accordance with one embodiment of the subject application. The method depicted in FIG. 7 begins at step 702, wherein document processing operation selection data is received from an associated user via the user interface 106 associated with a document processing device 104. The controller 108, or other suitable backend component associated with the document processing device 104, then prompts, at step 704, the user to select options associated with the selected document processing operation using the associated user interface 106. A determination is then made at step 706 whether the selected document processing operation requires the user to input a sequence of characters. For example, a sequence of characters would be required for an electronic mail operation, but such a sequence would not be necessary for a copy or print operation. When no such sequence is required, flow proceeds to step 718, whereupon the selected document processing operation is performed by the document processing device 104.

When a sequence is determined to be necessary, as determined by the controller 108 or other suitable backend component of the document processing device 104, corresponding to the selected document processing operation, flow proceeds to step 708, whereupon data representing a graphical user input interface is retrieved from the data storage device 110. The retrieved data is then used, at step 710, to generate a graphical representation of a user input device via a display associated with the user interface 106 of the document processing device 104. In accordance with the preferred embodiment of the subject application, the generated graphical user input interface includes a display of base character keys and modified character keys in a QWERTY keyboard configuration. At step 712, user selection data representing a selected character, as indicated by the user selection of a character key displayed on the associated user interface 106, is received. The selected character is then displayed on the associated display at step 714.

A determination is then made at step 716 whether an enter command has been received, preferably indicated by the user selection of graphical element displayed via the is user interface 106. When no such command has been received, flow returns to step 712, whereupon another character is received from the associated user. When the enter command has been received, flow proceeds to step 718, whereupon the document processing device 104 performs the selected document processing operation using the character sequence input by the user.

For example, when the user selects a facsimile operation, the user is prompted to select corresponding options. The controller 108 then determines, based upon the facsimile operation, that at least one sequence of characters is required to complete the selected operation, e.g., a recipient name, a facsimile number, a subject line, cover page data, and the like. In accordance with each such sequence, a QWERTY keyboard is generated enabling the user to input the desired character sequence. As each character is selected by the user, it is displayed in a corresponding field associated with the keyboard. Once all characters, e.g., the recipient's name, has been input, the user selects the enter command, whereupon the document processing device 104 proceeds to the next required character sequence. This process continues until the user selects the enter command and no other character sequences are required by the selected operation. Once all input data from the user has been received, the document processing device 104 performs the requested operation. In this case, the document processing device 104 generates the appropriate facsimile cover page, inserts the input recipient name, facsimile number, subject line, and the like, scans or otherwise generates the electronic image data of a document to be transmitted, and transmits the facsimile to the designated recipient.

Figure 8:
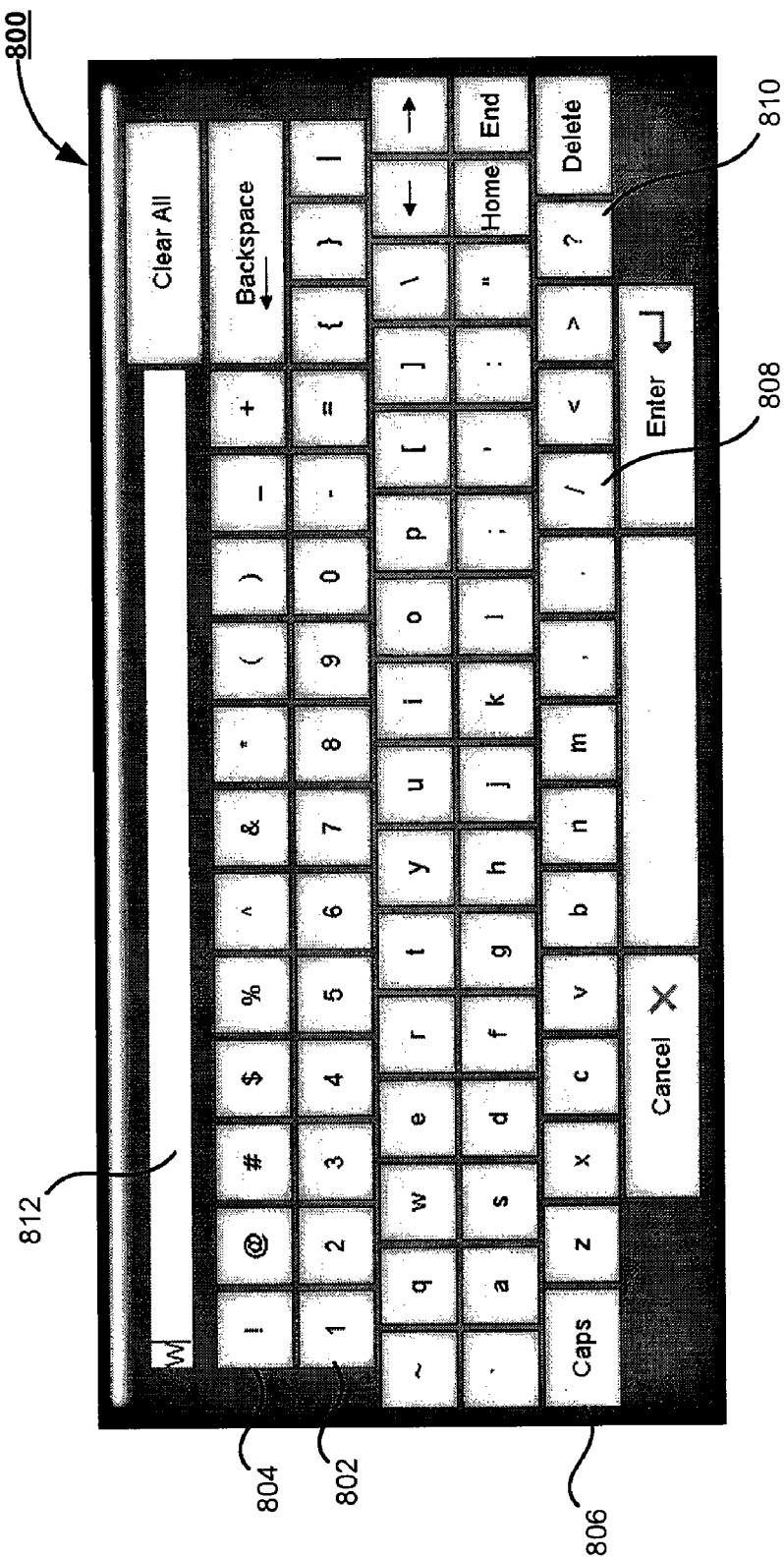
FIG. 8 is a screen template illustrating an example user input interface generated according to one embodiment of the subject application

Turning now to FIG. 8, there is shown an example template 800 illustrating a user input interface generated in accordance with the subject application. As shown in FIG. 8, the template 800 includes a plurality of icons, each associated with a respective alphanumeric character. The skilled artisan will recognize the various components of a standard QWERTY keyboard, including a plurality of base keys and a plurality of modified keys. For example, the base key "1" 802 and the modified key "!" 804 are displayed on the template 800. The skilled artisan will appreciate that the exclamation point "!" is accessible on a standard QWERTY keyboard by pressing and holding the SHIFT key and the number one (1) key simultaneously. As shown in FIG. 8, the modified key "!" 804 is located relatively close to its base key 802. The skilled artisan will appreciate that the proximal placement of the two character keys enables a user to easily locate and select the desired modified character. Similarly, the "/" character and the "?" are co-located on the same key on a standard QWERTY keyboard, requiring the selection of the modifier key SHIFT to alternate between the two characters. As shown in FIG. 8, the template 800 provides separate keys for both the "/" character (key 808) and the "?" character (key 810). The skilled artisan will appreciate that the two keys are located in close proximity not only to each other, but also to the general location are on the template 800 as they would appear on a standard QWERTY keyboard. In accordance with one embodiment of the subject application, the template 800 includes a modifier key 806, whereupon the selection of the key 806 results in the capitalization of the letter keys. The template 800 further illustrates a display field 812, wherein a selected character, modified or base, is displayed to the user for review.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A shift free keyboard input system comprising:
    a document processing device operable to complete at least one selected document processing operation on an electronic document;
    a controller associated with the document processing device, the controller including a processor and associated memory, the controller operable to commence operation of the document processing device to perform operations based on user-supplied character input; and
    a display generator operable to concurrently generate alphanumeric and symbolic keyboard indicia on a touch-screen interface of the document processing device in accordance with an operation of the document processing device requiring alphanumeric and symbolic user input as determined by the controller, the keyboard indicia including a user input area including a plurality of letter entry keys and a plurality of non-letter character keys arranged in a standardized keyboard layout;
    each of the plurality of non-letter character keys including an adjacent, concurrently viewable non-letter character key corresponding to a secondary character associated with a shift thereof on a standardized keyboard, on the standardized keyboard layout such that each function is available concurrently via a single keystroke selection and a separate input without selection of the shift key.

2. The shift free keyboard input system of claim 1 wherein the user input area is comprised of a touch screen, wherein each of the keys are formed on a sub-area thereof, having an associated visual indicator corresponding to the standardized keyboard layout.

3. The shift free keyboard input system of claim 2 wherein the standardized keyboard layout includes one of a QWERTY layout and a Dvorak layout.

4. The shift free keyboard input system of claim 2 wherein each of the plurality of non-letter character keys is disposed along a row above the letter entry keys, and wherein each adjacent, concurrently viewable non-letter character key is disposed along a row above the row of non-letter character keys.

5. The shift free keyboard input system of claim 4 wherein the plurality of non-letter character keys include numeric input keys.

6. The shift free keyboard input system of claim 2 wherein the touch screen is unable to process concurrent key inputs.

7. A method of generating a shift free keyboard input for document processing device control comprising the steps of:
    receiving an electronic document in to a document processing device operable to complete at least one selected document processing operation on an electronic document, the document processing device having a controller including a processor and associated memory;
    commencing, via the controller, operation of the document processing device to perform operations based on user-supplied character input; and
    responsive to the step of commencing operation of the document processing device, generating alphanumeric and symbolic keyboard indicia on a touch-screen interface of the document processing device in accordance with an operation of the document processing device requiring alphanumeric and symbolic user input as determined by the step of commencing operation of the document processing device, the keyboard indicia including a user input area including a plurality of letter entry keys and a plurality of non-letter character keys arranged in a standardized keyboard layout;
    wherein each of the plurality of non-letter character keys including an adjacent, concurrently viewable non-letter character key corresponding to a secondary character associated with a shift thereof on a standardized keyboard, on the standardized keyboard layout such that each function is available concurrently via a single keystroke selection and a separate input without selection of a shift key.

8. The method of claim 7 wherein the user input area is comprised of a touch screen, wherein each of the keys are formed on a sub-area thereof, having an associated visual indicator corresponding to the standardized keyboard layout.

9. The method of claim 8 wherein the standardized keyboard layout includes one of a QWERTY layout and a Dvorak layout.

10. The method of claim 8 wherein each of the plurality of non-letter character keys is disposed along a row above the letter entry keys, and wherein each adjacent, concurrently viewable non-letter character key is disposed along a row above the row of non-letter character keys.

11. The method of claim 10 wherein the plurality of non-letter character keys include numeric input keys.

12. The method of claim 8 wherein the touch screen is unable to process concurrent key inputs.

\* \* \* \* \*